US011981834B2

(12) United States Patent
Cheng et al.

(10) Patent No.: US 11,981,834 B2
(45) Date of Patent: May 14, 2024

(54) HIGH-TEMPERATURE FAST-CURING STARCH-BASED ADHESIVE FOR PARTICLEBOARDS AND PREPARATION METHOD THEREOF

(71) Applicant: Jiangnan University, Wuxi (CN)

(72) Inventors: Li Cheng, Wuxi (CN); Zhengbiao Gu, Wuxi (CN); Yan Hong, Wuxi (CN); Zhaofeng Li, Wuxi (CN); Caiming Li, Wuxi (CN); Xiaofeng Ban, Wuxi (CN); Junnan Jin, Wuxi (CN); Dongdong Wu, Wuxi (CN); Mengwei Zhang, Wuxi (CN); Jian Yin, Wuxi (CN)

(73) Assignee: JIANGNAN UNIVERSITY, Wuxi (CN)

(*) Notice: Subject to any disclaimer, the term of this patent is extended or adjusted under 35 U.S.C. 154(b) by 0 days.

(21) Appl. No.: 18/530,577

(22) Filed: Dec. 6, 2023

(65) Prior Publication Data

US 2024/0101873 A1 Mar. 28, 2024

Related U.S. Application Data

(63) Continuation of application No. PCT/CN2022/135350, filed on Nov. 30, 2022.

(30) Foreign Application Priority Data

Mar. 30, 2022 (CN) .......................... 202210330560.8

(51) Int. Cl.
| | | |
|---|---|---|
| *C09J 103/00* | (2006.01) | |
| *B27N 3/08* | (2006.01) | |
| *C09J 5/06* | (2006.01) | |
| *C09J 11/04* | (2006.01) | |
| *C09J 11/06* | (2006.01) | |
| *C09J 11/08* | (2006.01) | |
| *C09J 103/02* | (2006.01) | |

(52) U.S. Cl.
CPC .............. *C09J 103/02* (2013.01); *B27N 3/08* (2013.01); *C09J 5/06* (2013.01); *C09J 11/04* (2013.01); *C09J 11/06* (2013.01); *C09J 11/08* (2013.01)

(58) Field of Classification Search
None
See application file for complete search history.

(56) References Cited

U.S. PATENT DOCUMENTS

| | | | |
|---|---|---|---|
| 5,116,890 | A | 5/1992 | Floyd et al. |
| 2004/0158056 | A1* | 8/2004 | Hiemstra ............... C08B 31/003 |
| | | | 536/106 |

FOREIGN PATENT DOCUMENTS

| | | |
|---|---|---|
| CN | 101892024 A | 11/2010 |
| CN | 102653667 A | 9/2012 |
| CN | 102863933 A | 1/2013 |
| CN | 104109220 A | 10/2014 |
| CN | 104152085 A | 11/2014 |
| CN | 106221609 A | 12/2016 |
| CN | 106398605 A | 2/2017 |
| CN | 108485559 A | 9/2018 |
| CN | 111647112 A | 9/2020 |
| CN | 114106749 A | 3/2022 |
| CN | 114591707 A | 6/2022 |
| JP | 2005330384 A | 12/2005 |
| WO | 2019132805 A1 | 7/2019 |

OTHER PUBLICATIONS

Wang, Zhenjiong et. al. "Study on the influence of different emulsifier on properties of starch based wood adhesive" Jour. of Nanjing Xiaozhuang University. No. 6, Nov. 2019.
Wang, Guyue et. al. "Progress in chemical modification of starch-based wood adhesives" China Forest Products Industry, No. 6, Nov. 18, 2011.
Wang, Panjun et. al. "Processing technology of high solid content starch-based wood adhesive" Jour. of Food Science and Biotechnology. vol. 34 No. 7 Jul. 15, 2015.
Zhenjiong Wang, et. al. "Preparation, characterization and properties of starch-based wood adhesive" Carbohydrate Polymers vol. 88 No. 2 Apr. 2, 2012.

* cited by examiner

*Primary Examiner* — Stefanie J Cohen
(74) *Attorney, Agent, or Firm* — IPRO, PLLC; Na Xu

(57) ABSTRACT

The present disclosure discloses a high-temperature fast-curing starch-based adhesive for particleboards and a preparation method thereof, belonging to the technical field of adhesive preparation. The low viscosity of the starch-based adhesive is ensured by selecting a crosslinking monomer which does not self-crosslink in a reaction process in the present disclosure, and a binary crosslinking agent matched with the crosslinking monomer is added before use to be quickly crosslinked with the crosslinking monomer at high temperature so as to ensure better thermosetting property and water resistance as well as faster curing speed of the starch-based adhesive at the same time, which meets the requirements of the particleboards for the adhesive, solves the problem of long curing time of the existing starch-based adhesives at high temperatures, further shortens the curing time of the starch-based adhesives to about 60 s, and improves the production efficiency of the particleboards.

10 Claims, No Drawings

HIGH-TEMPERATURE FAST-CURING STARCH-BASED ADHESIVE FOR PARTICLEBOARDS AND PREPARATION METHOD THEREOF

TECHNICAL FIELD

The present disclosure relates to a high-temperature fast-curing starch-based adhesive for particleboards and a preparation method thereof, belonging to the technical field of adhesive preparation.

BACKGROUND

In recent years, with the rapid development of China's economy, the urban construction and indoor and outdoor decoration industries have developed rapidly, which has promoted the rapid growth and expansion of the wood-based panel industry. In 2018, the output of wood-based panels in China has exceeded the total output of other countries in the world, followed by the rapid development of the adhesive industry. Most of the traditional adhesives used in wood-based panels mainly include urea formaldehyde resin (UF), phenol formaldehyde resin (PF) and melamine formaldehyde resin (MF), which are cheap in price, but serious in pollution and health hazards. Therefore, it is necessary to develop an environment-friendly natural resource adhesive with good water resistance and adhesion properties.

Starch is a naturally degradable, environmentally friendly and renewable material, which has the characteristics of being wide in sources, low in price, non-toxic, non-polluting, etc. Compared with the common adhesives on the market, starch-based adhesives are prepared by using the starch instead of petroleum-based monomers, thus being environmentally friendly and significantly reducing costs. Therefore, starch-based wood adhesives have great potential for development in the future. At present, the common wood-based panels on the market are made by hot-pressing, and particleboards are an indispensable type of wood-based panels. The hot-pressing process of the particleboards is short in time and high in temperature, which requires the adhesive to be able to withstand high temperature and quickly cure at the high temperature, and to have lower viscosity and certain water resistance, while the traditional starch-based adhesive has high viscosity, cannot bear high temperature, lacks thermosetting property, and is poor in water resistance. In response to the above requirements for the particleboard adhesive, the research team has previously prepared a low-viscosity starch-based adhesive with thermosetting property, and has achieved great improvements in water resistance, modulus of rupture and the like of the adhesive, but the prepared adhesive has the problems such as long curing time and low curing efficiency, which are difficult to promote the wider application of the starch-based adhesive.

SUMMARY

Technical Problem

The starch-based adhesives prepared in the past cannot meet the requirements of modern particleboard preparation because of its long curing time, low curing efficiency and other problems in the hot-pressing process, resulting in long hot-pressing time and low production efficiency of particleboards.

Technical Solution

In order to solve the above problems, the present disclosure provides a high-temperature fast-curing starch-based adhesive for particleboards and a preparation method thereof. The low viscosity of the starch-based adhesive is ensured by selecting a crosslinking monomer which does not self-crosslink in the preparation process, and a binary crosslinking agent matched with the crosslinking monomer is added before use to be quickly crosslinked with the crosslinking monomer at high temperature so as to ensure better thermosetting property and water resistance as well as faster curing speed of the starch-based adhesive, which meets the requirements of the particleboards for the adhesive. The present disclosure has conducted a lot of research on the control of acid hydrolysis time, initiator addition amount, crosslinking monomer addition amount, and reaction temperature in three key steps, so that the prepared adhesive can be quickly cured during hot-pressing after a binary crosslinking agent is added while maintaining low viscosity; therefore, the hot-pressing time is greatly shortened, and the production efficiency of the particleboards is improved on the premise of ensuring water resistance and thermosetting property. All properties of the particleboards pressed by using the adhesive prepared according the present disclosure can meet the particleboard performance requirements for P2 type in the national standard GB/T 4897-2015. Compared with the previous research, the curing time of the starch-based adhesive is reduced to 70 s or less.

In terms of key control points, the present disclosure provides precise control for the following control points.

① Acid hydrolysis time, the acid hydrolysis time shall not be less than 2 h. If the acid hydrolysis time is too short, the acid hydrolysis effect is poor, which leads to excessive viscosity of the starch-based adhesive, and is not suitable for the particleboards; and if the acid hydrolysis time is too long, excessive starch disintegration leads to low monomer grafting efficiency, which directly affects water resistance and thermosetting property.

② The initiator addition amount shall not be less than 5% of the amount of starch. Dissolving in dilute nitric acid can improve the initiation efficiency. If the amount of an initiator added is too little, the grafting effect will become poor, so that the thermosetting time is prolonged. Furthermore, a better effect will be achieved by adding the initiator in batches.

③ The crosslinking monomer addition amount shall not be less than 10% of the amount of the starch. Too little addition of the crosslinking monomer directly leads to the reduction of the bonding strength and water resistance of the starch-based adhesive.

④ The reaction temperature shall not be lower than 75° C. If the reaction temperature is too high or too low, it will affect the reaction efficiency of the crosslinking monomer, which will lead to insufficient water resistance and thermosetting property of the adhesive.

⑤ The binary crosslinking agent addition amount shall not be less than 10% of the amount of the starch. Too little addition of the binary crosslinking agent will prolong the curing time of the adhesive.

The first object of the present disclosure is to provide a high-temperature fast-curing starch-based adhesive for particleboards, where the formula of the starch-based adhesive for the particleboards includes: (in parts by mass)
starch 150 parts
water 250-500 parts
concentrated hydrochloric acid 8-20 parts dilute nitric acid 8-13 parts
a sodium hydroxide solution 25-40 parts
an initiator 6-10 parts
a crosslinking monomer 12-18 parts
an emulsifier 2-5 parts
a binary crosslinking agent 12-18 parts.

The second object of the present disclosure is to provide a preparation method of the high-temperature fast-curing starch-based adhesive for the particleboards. The preparation method is described as follows:

Starch slurry made of the starch is used as a main raw material, and after acid hydrolysis treatment is carried out on the starch slurry, the pH is adjusted and pre-gelatinization is performed; an emulsifier solution and part of an initiator solution are prepared, respectively; the emulsifier solution and the crosslinking monomer are pre-emulsified to prepare a pre-emulsion; the prepared part of the initiator solution is added to the above pre-gelatinized starch slurry, the remaining initiator is added for heat preservation after a grafting reaction occurs, and after the reaction is completed, the product is cooled and subjected to pH adjustment, so that the starch-based adhesive is obtained; and when in use, the starch-based adhesive shall be mixed with the binary crosslinking agent evenly before use.

In one embodiment of the present disclosure, the preparation method specifically includes the following steps:
(1) blending the starch and the water into starch slurry with a mass ratio of 30-50% on a dry basis of starch, and stirring evenly for later use;
(2) heating the starch slurry obtained in step (1) up to 60° C., adding hydrochloric acid diluted to 0.8-1.2 mol/L for acid hydrolysis, and then adding the sodium hydroxide solution to adjust the pH of the starch slurry to 3-5; after the acid hydrolysis, adjusting the temperature of the starch slurry to 70-90° C., and pre-gelatinizing to obtain pre-gelatinized starch slurry;
(3) taking the initiator that accounts for 30% to 60% of the total mass of the initiator and adding the dilute nitric acid to prepare an initiator solution; taking a certain mass of the emulsifier and adding water to prepare an emulsifier solution with a mass concentration of 2% to 6%; mixing the prepared emulsifier solution with 10-20 g of the crosslinking monomer, and then performing pre-emulsification by using a high-speed shearing machine to prepare a pre-emulsion;
(4) adding all the initiator solution obtained in step (3) to the pre-gelatinized starch slurry obtained in step (2), and dropwise adding the pre-emulsion obtained in step (3) to the pre-gelatinized starch slurry obtained in step (2) at a constant speed; after the dropwise addition is completed, adding a reformulated initiator solution, where the reformulated initiator solution is prepared by adding the dilute nitric acid to the remaining initiator which accounts for 40% to 70% of the total mass of the initiator to formulate the initiator solution, and carrying out heat preservation again, so as to obtain a modified mixed emulsion system; and
(5) cooling the modified mixed emulsion system obtained in step (4) to 30-50° C., and adjusting the pH of the emulsion to 6-8 to obtain the starch-based adhesive.

In one embodiment of the present disclosure, the preparation method specifically includes the following steps:
(1) blending the starch and the water into starch slurry with a mass ratio of 30-50% on a dry basis of starch, and stirring evenly for later use;
(2) heating the starch slurry obtained in step (1) up to 60° C., adding hydrochloric acid diluted to 0.8-1.2 mol/L for performing acid hydrolysis for 2-4 h, and then adding the sodium hydroxide solution to adjust the pH of the starch slurry to 3-5; after the acid hydrolysis, adjusting the temperature of the starch slurry to 70-90° C., and pre-gelatinizing for 30-60 min to obtain pre-gelatinized starch slurry;
(3) taking the initiator that accounts for 30% to 60% of the total mass of the initiator and adding the dilute nitric acid to prepare an initiator solution; taking a certain mass of the emulsifier and adding water to prepare an emulsifier solution with a mass concentration of 2% to 6%; mixing the prepared emulsifier solution with 10-20 g of the crosslinking monomer, and then performing pre-emulsification by using a high-speed shearing machine to prepare a pre-emulsion;
(4) adding all the initiator solution obtained in step (3) to the pre-gelatinized starch slurry obtained in step (2), and dropwise adding the pre-emulsion obtained in step (3) to the pre-gelatinized starch slurry obtained in step (2) at a constant speed, where the dropwise addition time is controlled within 90-120 min; after the dropwise addition is completed, adding a reformulated initiator solution, where the reformulated initiator solution is prepared by adding the dilute nitric acid to the remaining initiator which accounts for 40% to 70% of the total mass of the initiator to formulate the initiator solution, and carrying out heat preservation for 90-120 min again, so as to obtain a modified mixed emulsion system; and
(5) cooling the modified mixed emulsion system obtained in step (4) to 30-50° C., and adjusting the pH of the emulsion to 6-8 to obtain the starch-based adhesive.

In one embodiment of the present disclosure, the starch is any one or a combination of more of corn starch, waxy corn starch, tapioca starch, wheat starch, and potato starch.

In one embodiment of the present disclosure, the acid hydrolysis time of step (2) is 2-4 h.

In one embodiment of the present disclosure, the concentration of hydrochloric acid diluted of step (2) is 1 mol/L.

In one embodiment of the present disclosure, the reaction temperature of step (2) is 80° C.

In one embodiment of the present disclosure, the pre-gelatinization time of step (2) is 30-60 min.

In one embodiment of the present disclosure, the dropwise addition time of step (4) is controlled within 90-120 min.

In one embodiment of the present disclosure, the heat preservation time of step (4) is 90-120 min.

In one embodiment of the present disclosure, the concentrated hydrochloric acid is 12 mol/L concentrated hydrochloric acid.

In one embodiment of the present disclosure, the sodium hydroxide solution is a sodium hydroxide solution with a concentration of 10 mol/L.

In one embodiment of the present disclosure, the dilute nitric acid is a 0.5 mol/L nitric acid solution.

In one embodiment of the present disclosure, the initiator is cerium nitrate salt.

In one embodiment of the present disclosure, the emulsifier is disodium sulfosuccinate decyl polyoxyethylene (6) ether ester.

In one embodiment of the present disclosure, the crosslinking monomer is one or a mixture of diacetone acrylamide and hydroxybutyl methacrylate.

In one embodiment of the present disclosure, the binary crosslinking agent is one or a mixture of adipic dihydrazide and succinic dihydrazide.

The third object of the present disclosure is to provide application of the high-temperature fast-curing starch-based adhesive in hot-press bonding of the particleboards, plywood, fiberboard, wood blocks and other boards.

In one embodiment of the present disclosure, the starch-based adhesive and the binary crosslinking agent are used in combination when the high-temperature fast-curing starch-based adhesive for the particleboards is applied.

In one embodiment of the present disclosure, the hot-press bonding method of the particleboards is as follows: the high-temperature fast-curing starch-based adhesive and wood shavings are evenly mixed and paved, the hot-pressing is performed under the conditions that the hot-pressing pressure is 3-11 MPa and the hot-pressing temperature is 130-180° C.

BENEFICIAL EFFECT (1) The present disclosure reduces the viscosity of the starch-based adhesive by means of acid hydrolysis, thus ensuring lower viscosity during application. The reaction efficiency is improved by adding the crosslinking monomer dropwise. The selected crosslinking monomer does not crosslink at room temperature and reaction temperature, but can be rapidly crosslinked with the binary crosslinking agent during hot-pressing after the binary crosslinking agent is added so as to form a macromolecular network structure, which guarantees strong water resistance and bonding strength while reducing the curing time of the adhesive.

(2) The crosslinking monomer combined with the binary crosslinking agent solves the problem of long curing time of the previous starch-based adhesives at high temperature, further reduces the curing time of the starch-based adhesives to 70 s or less, and improves the production efficiency of the particleboards.

(3) All properties of the particleboards pressed by using the adhesive prepared according the present disclosure can meet the performance requirements for P2 type particleboards in the GB/T 4897-2015. The particleboards can be soaked in water at 20° C. for 2 h without disintegration, with a thickness swelling rate of water absorption being 7%, thus being better in water resistance. Therefore, the application of the starch-based adhesive is further perfected.

DETAILED DESCRIPTION

The present disclosure will be further illustrated below in conjunction with embodiments. It should be understood that these examples are only used for illustrative purposes and do not limit the protection scope of the present disclosure.

Determination of Adhesive Curing Time:

30 g of an adhesive and 0.5 g of a binary crosslinking agent were separately added into a beaker and mixed thoroughly. 2.0 g of the mixture in the beaker was transferred to a test tube. A stirring rod was inserted into the test tube. The test tube and stirring rod were placed in a beaker filled with boiling water, the stopwatch was immediately started and the sample began to cure under stirring. When the stirring rod could not be lifted, the stopwatch was stopped immediately, and the measured time represented the adhesive curing time. Each sample was subjected to three parallel experiments, and an average value was taken.

Example 1

| Formula (mass/g): | |
|---|---|
| corn starch | 150 |
| water | 350 |
| a 12 mol/L concentrated hydrochloric acid solution | 18 |
| a 10 mol/L sodium hydroxide solution | 33 |
| a 0.5 mol/L dilute nitric acid solution | 10 |
| ceric ammonium nitrate (an initiator) | 8 |
| disodium sulfosuccinate decyl polyoxyethylene (6) ether ester (an emulsifier) | 1.96 |
| diacetone acrylamide (a crosslinking monomer) | 15 |
| adipic dihydrazide (a binary crosslinking agent) | 15 |

Technological Process:
(1) the starch and the water were blended into starch slurry with a mass ratio of 45% on a dry basis of starch, and stirred evenly for later use;
(2) the starch slurry obtained in step (1) was heated up to 60° C., 18 g of the 12 mol/L concentrated hydrochloric acid solution was diluted to 1 mol/L and then added into the starch slurry for acid hydrolysis, and the acid hydrolysis was carried out for 2.5 h; after that, the 10 mol/L sodium hydroxide solution was added to adjust pH to 4; the temperature of the acid-hydrolyzed starch slurry was adjusted to 80° C., and the reaction temperature was kept unchanged at 80° C. after pre-gelatinization for 40 min;
(3) 4 g of the initiator was dissolved in 5 g of dilute nitric acid to prepare an initiator solution, 1.96 g of the emulsifier was dissolved in 24.8 g of water to prepare a 5% emulsifier solution, all 15 g of the crosslinking monomer was added to the emulsifier, and pre-emulsification was performed by using a high-speed shearing machine to prepare a pre-emulsion;
(4) all the initiator solution obtained in step (3) was added to the pre-gelatinized starch slurry obtained in step (2), and the pre-emulsion was dripped into the reaction system obtained after pre-gelatinization in step (2) at a constant speed within 90 min; after the dropwise addition was completed, 4 g of the initiator was added again and dissolved in 5 g of the dilute nitric acid to prepare an initiator solution, and the reaction was carried out for 90 min to obtain a modified mixed emulsion system;
(5) the modified mixed emulsion system obtained in step (4) was cooled to 50° C., and the pH of the emulsion was adjusted to 6, so that the starch-based adhesive was obtained; and
(6) when in use, the obtained starch-based adhesive and the binary crosslinking agent were pre-mixed uniformly and then applied to hot-pressing of the particleboards.

The product obtained in this example has a milky white and glossy appearance, and is lower in initial viscosity, which meets the use requirements of the particleboards. Referring to the method of "Determination of adhesive curing time" mentioned earlier, the adhesive curing time was determined to be 60 s.

The thickness swelling rates of water absorption of the particleboards obtained by hot-pressing for 5 min at 170° C.

and 11 MPa are 6%, which meets the requirement for P2 type particleboards in the national standard.

Example 2

| Formula (mass/g): | |
|---|---|
| corn starch | 150 |
| water | 350 |
| a 12 mol/L concentrated hydrochloric acid solution | 18 |
| a 10 mol/L sodium hydroxide solution | 33 |
| a 0.5 mol/L dilute nitric acid solution | 10 |
| ceric ammonium nitrate (an initiator) | 8 |
| disodium sulfosuccinate decyl polyoxyethylene (6) ether ester (an emulsifier) | 1.96 |
| diacetone acrylamide (a crosslinking monomer) | 15 |
| adipic dihydrazide (a binary crosslinking agent) | 15 |

Technological Process:

(1) the starch and the water were blended into starch slurry with a mass ratio of 45% on a dry basis of starch, and stirred evenly for later use;

(2) the starch slurry obtained in step (1) was heated up to 60° C., 18 g of the 12 mol/L concentrated hydrochloric acid solution was diluted to 1 mol/L and then added into the starch slurry for acid hydrolysis, and the acid hydrolysis was carried out for 1 h; after that, the 10 mol/L sodium hydroxide solution was added to adjust pH to 4; the temperature of the acid-hydrolyzed starch slurry was adjusted to 80° C., and the reaction temperature was kept unchanged at 80° C. after pre-gelatinization for 40 min;

(3) 4 g of the initiator was dissolved in 5 g of dilute nitric acid to prepare an initiator solution, 1.96 g of the emulsifier was dissolved in 24.8 g of water to prepare a 5% emulsifier solution, all 15 g of the crosslinking monomer was added to the emulsifier, and pre-emulsification was performed by using a high-speed shearing machine to prepare a pre-emulsion;

(4) all the initiator solution obtained in step (3) was added to the pre-gelatinized starch slurry obtained in step (2), and the pre-emulsion was dripped into the reaction system obtained after pre-gelatinization in step (2) at a constant speed within 90 min; after the dropwise addition was completed, 4 g of the initiator was added again and dissolved in 5 g of the dilute nitric acid to prepare an initiator solution, and the reaction was carried out for 90 min to obtain a modified mixed emulsion system;

(5) the modified mixed emulsion system obtained in step (4) was cooled to 50° C., and the pH of the emulsion was adjusted to 6, so that the starch-based adhesive was obtained; and (6) when in use, the obtained starch-based adhesive and the binary crosslinking agent were pre-mixed uniformly and then applied to hot-pressing of the particleboards.

The product obtained in this example has a milky white appearance, and is poor in fluidity and higher in viscosity, which cannot meet the use requirements of the particleboards and has no application value.

Example 3

| Formula (mass/g): | |
|---|---|
| corn starch | 150 |
| water | 350 |
| a 12 mol/L concentrated hydrochloric acid solution | 18 |
| a 10 mol/L sodium hydroxide solution | 33 |
| a 0.5 mol/L dilute nitric acid solution | 10 |
| ceric ammonium nitrate (an initiator) | 8 |
| disodium sulfosuccinate decyl polyoxyethylene (6) ether ester (an emulsifier) | 1.96 |
| diacetone acrylamide (a crosslinking monomer) | 15 |
| adipic dihydrazide (a binary crosslinking agent) | 15 |

Technological process:

(1) the starch and the water were blended into starch slurry with a mass ratio of 45% on a dry basis of starch, and stirred evenly for later use;

(2) the starch slurry obtained in step (1) was heated up to 60° C., 18 g of the 12 mol/L concentrated hydrochloric acid solution was diluted to 1 mol/L and then added into the starch slurry for acid hydrolysis, and the acid hydrolysis was carried out for 4 h; after that, the 10 mol/L sodium hydroxide solution was added to adjust pH to 4; the temperature of the acid-hydrolyzed starch slurry was adjusted to 80° C., and the reaction temperature was kept unchanged at 80° C. after pre-gelatinization for 40 min;

(3) 4 g of the initiator was dissolved in 5 g of dilute nitric acid to prepare an initiator solution, 1.96 g of the emulsifier was dissolved in 24.8 g of water to prepare a 5% emulsifier solution, all 15 g of the crosslinking monomer was added to the emulsifier, and pre-emulsification was performed by using a high-speed shearing machine to prepare a pre-emulsion;

(4) all the initiator solution obtained in step (3) was added to the pre-gelatinized starch slurry obtained in step (2), and the pre-emulsion was dripped into the reaction system obtained after pre-gelatinization in step (2) at a constant speed within 90 min; after the dropwise addition was completed, 4 g of the initiator was added again and dissolved in 5 g of the dilute nitric acid to prepare an initiator solution, and a thermal reaction was carried out for 90 min to obtain a crosslinked and modified mixed emulsion system;

(5) the crosslinked and modified mixed emulsion system obtained in step (4) was cooled to 50° C., and the pH of the emulsion was adjusted to 6, so that the starch-based adhesive was obtained; and (6) when in use, the obtained starch-based adhesive and the binary crosslinking agent were pre-mixed uniformly and then applied to hot-pressing of the particleboards.

The product obtained in this example has a milky white and glossy appearance, and is very low in initial viscosity. Referring to the method of "Determination of adhesive curing time" mentioned earlier, the adhesive curing time was determined to be 140 s; and after the adhesive was placed for a period of time, delamination occurred, which proved that the adhesive has no practical value.

Examples 1, 2 and 3 are used to demonstrate the effect of acid hydrolysis time on the viscosity of the adhesive. From the above data, it can be seen that if the acid hydrolysis time is too short, the acid hydrolysis effect is poor, which leads to excessive viscosity and poor fluidity of the adhesive, and thus cannot meet the use requirements of the particleboards; and if the acid hydrolysis time is too long, so that the starch is excessively disintegrated, the reaction effect is poor, the curing time becomes longer, and the effect of rapid curing cannot be achieved.

Example 4

| Formula (mass/g): | |
| --- | --- |
| corn starch | 150 |
| water | 350 |
| a 12 mol/L concentrated hydrochloric acid solution | 18 |
| a 10 mol/L sodium hydroxide solution | 33 |
| a 0.5 mol/L dilute nitric acid solution | 10 |
| ceric ammonium nitrate (an initiator) | 8 |
| disodium sulfosuccinate decyl polyoxyethylene (6) ether ester (an emulsifier) | 1.96 |
| N-hydroxyethyl acrylamide (a crosslinking monomer) | 15 |
| adipic dihydrazide (a binary crosslinking agent) | 15 |

Technological Process:
(1) the starch and the water were blended into starch slurry with a mass ratio of 45% on a dry basis of starch, and stirred evenly for later use;
(2) the starch slurry obtained in step (1) was heated up to 60° C., 18 g of the 12 mol/L concentrated hydrochloric acid solution was diluted to 1 mol/L and then added into the starch slurry for acid hydrolysis, and the acid hydrolysis was carried out for 2.5 h; after that, the 10 mol/L sodium hydroxide solution was added to adjust pH to 4; the temperature of the acid-hydrolyzed starch slurry was adjusted to 80° C., and the reaction temperature was kept unchanged at 80° C. after pre-gelatinization for 40 min;
(3) 4 g of the initiator was dissolved in 5 g of dilute nitric acid to prepare an initiator solution, 1.96 g of the emulsifier was dissolved in 24.8 g of water to prepare a 5% emulsifier solution, all 15 g of the crosslinking monomer was added to the emulsifier, and pre-emulsification was performed by using a high-speed shearing machine to prepare a pre-emulsion;
(4) all the initiator solution obtained in step (3) was added to the pre-gelatinized starch slurry obtained in step (2), and the pre-emulsion was dripped into the reaction system obtained after pre-gelatinization in step (2) at a constant speed within 90 min; after the dropwise addition was completed, 4 g of the initiator was added again and dissolved in 5 g of the dilute nitric acid to prepare an initiator solution, and the reaction was carried out for 90 min to obtain a modified mixed emulsion system;
(5) the modified mixed emulsion system obtained in step (4) was cooled to 50° C., and the pH of the emulsion was adjusted to 6, so that the starch-based adhesive was obtained; and
(6) when in use, the obtained starch-based adhesive and the binary crosslinking agent were pre-mixed uniformly and then applied to hot-pressing of the particleboards.

The product obtained in this example has a milky white and glossy appearance, and is lower in initial viscosity, which meets the use requirements of the particleboards. Referring to the method of "Determination of adhesive curing time" mentioned earlier, the adhesive curing time was determined to be 150 s.

The thickness swelling rates of water absorption of the particleboards obtained by hot-pressing for 5 min at 170° C. and 11 MPa are 15%, which does not meet the requirement for P2 type particleboards in the national standard.

Examples 1 and 4 are used to demonstrate the effect of the crosslinking monomer on the adhesive curing time. From the above data, the significance analysis shows that the adhesive prepared from the diacetone acrylamide is shorter in curing time when being used in combination with the adipic dihydrazide, which can meet the rapid curing requirement of the particleboard adhesive, while the adhesive prepared from N-hydroxyethyl acrylamide is longer in curing time and low in curing efficiency when being used in combination with the adipic dihydrazide, which cannot meet the demand for the particleboard adhesive.

Example 5

| Formula (mass/g): | |
| --- | --- |
| corn starch | 150 |
| water | 350 |
| a 12 mol/L concentrated hydrochloric acid solution | 18 |
| a 10 mol/L sodium hydroxide solution | 33 |
| a 0.5 mol/L dilute nitric acid solution | 10 |
| ceric ammonium nitrate (an initiator) | 8 |
| disodium sulfosuccinate decyl polyoxyethylene (6) ether ester (an emulsifier) | 1.96 |
| diacetone acrylamide (a crosslinking monomer) | 15 |

Technological Process:
(1) the starch and the water were blended into starch slurry with a mass ratio of 45% on a dry basis of starch, and stirred evenly for later use;
(2) the starch slurry obtained in step (1) was heated up to 60° C., 18 g of the 12 mol/L concentrated hydrochloric acid solution was diluted to 1 mol/L and then added into the starch slurry for acid hydrolysis, and the acid hydrolysis was carried out for 2.5 h; after that, the 10 mol/L sodium hydroxide solution was added to adjust pH to 4; the temperature of the acid-hydrolyzed starch slurry was adjusted to 80° C., and the reaction temperature was kept unchanged at 80° C. after pre-gelatinization for 40 min;
(3) 4 g of the initiator was dissolved in 5 g of dilute nitric acid to prepare an initiator solution, 1.96 g of the emulsifier was dissolved in 24.8 g of water to prepare a 5% emulsifier solution, all 15 g of the crosslinking monomer was added to the emulsifier, and pre-emulsification was performed by using a high-speed shearing machine to prepare a pre-emulsion;
(4) all the initiator solution obtained in step (3) was added to the pre-gelatinized starch slurry obtained in step (2), and the pre-emulsion was dripped into the reaction system obtained after pre-gelatinization in step (2) at a constant speed within 90 min; after the dropwise addition was completed, 4 g of the initiator was added again and dissolved in 5 g of the dilute nitric acid to prepare an initiator solution, and the reaction was carried out for 90 min to obtain a modified mixed emulsion system;

(5) the modified mixed emulsion system obtained in step (4) was cooled to 50° C., and the pH of the emulsion was adjusted to 6, so that the starch-based adhesive was obtained; and The product obtained in this example has a milky white and glossy appearance, and is lower in initial viscosity, which meets the use requirements of the particleboards. The curing time is determined by referring to the above-mentioned method of "Determination of adhesive curing time" without adding a binary crosslinking agent, and the obtained adhesive cannot be cured and thus is not available.

Example 6

| Formula (mass/g): | |
|---|---|
| corn starch | 150 |
| water | 350 |
| a 12 mol/L concentrated hydrochloric acid solution | 18 |
| a 10 mol/L sodium hydroxide solution | 33 |
| a 0.5 mol/L dilute nitric acid solution | 10 |
| ceric ammonium nitrate (an initiator) | 8 |
| disodium sulfosuccinate decyl polyoxyethylene (6) ether ester (an emulsifier) | 1.96 |
| diacetone acrylamide (a crosslinking monomer) | 15 |
| ammonium chloride (a binary crosslinking agent) | 15 |

Technological Process:
(1) the starch and the water were blended into starch slurry with a mass ratio of 45% on a dry basis of starch, and stirred evenly for later use;
(2) the starch slurry obtained in step (1) was heated up to 60° C., 18 g of the 12 mol/L concentrated hydrochloric acid solution was diluted to 1 mol/L and then added into the starch slurry for acid hydrolysis, and the acid hydrolysis was carried out for 2.5 h; after that, the 10 mol/L sodium hydroxide solution was added to adjust pH to 4; the temperature of the acid-hydrolyzed starch slurry was adjusted to 80° C., and the reaction temperature was kept unchanged at 80° C. after pre-gelatinization for 40 min;
(3) 4 g of the initiator was dissolved in 5 g of dilute nitric acid to prepare an initiator solution, 1.96 g of the emulsifier was dissolved in 24.8 g of water to prepare a 5% emulsifier solution, all 15 g of the crosslinking monomer was added to the emulsifier, and pre-emulsification was performed by using a high-speed shearing machine to prepare a pre-emulsion;
(4) all the initiator solution obtained in step (3) was added to the pre-gelatinized starch slurry obtained in step (2), and the pre-emulsion was dripped into the reaction system obtained after pre-gelatinization in step (2) at a constant speed within 90 min; after the dropwise addition was completed, 4 g of the initiator was added again and dissolved in 5 g of the dilute nitric acid to prepare an initiator solution, and the reaction was carried out for 90 min to obtain a modified mixed emulsion system;
(5) the modified mixed emulsion system obtained in step (4) was cooled to 50° C., and the pH of the emulsion was adjusted to 6, so that the starch-based adhesive was obtained; and
(6) when in use, the obtained starch-based adhesive and the binary crosslinking agent were pre-mixed uniformly and then applied to hot-pressing of the particleboards.

The product obtained in this example has a milky white and glossy appearance, and is lower in initial viscosity, which meets the use requirements of the particleboards. The curing time is determined by referring to the above-mentioned method of "Determination of adhesive curing time", and the obtained adhesive cannot be cured.

Examples 1, 5 and 6 are used to demonstrate the effect of the binary crosslinking agent on the adhesive curing time. From the above data, the significance analysis shows that the adhesive can be quickly cured after the addition of the binary crosslinking agent, while the adhesive without the binary crosslinking agent or added with other binary crosslinking agents cannot be cured completely, and thus cannot be applied to the particleboards.

Example 7

| Formula (mass/g): | |
|---|---|
| corn starch | 150 |
| water | 350 |
| a 12 mol/L concentrated hydrochloric acid solution | 18 |
| a 10 mol/L sodium hydroxide solution | 33 |
| a 0.5 mol/L dilute nitric acid solution | 10 |
| ceric ammonium nitrate (an initiator) | 8 |
| disodium sulfosuccinate decyl polyoxyethylene (6) ether ester (an emulsifier) | 1.96 |
| diacetone acrylamide (a crosslinking monomer) | 15 |
| adipic dihydrazide (a binary crosslinking agent) | 15 |

Technological Process:
(1) the starch and the water were blended into starch slurry with a mass ratio of 45% on a dry basis of starch, and stirred evenly for later use;
(2) the starch slurry obtained in step (1) was heated up to 60° C., 18 g of the 12 mol/L concentrated hydrochloric acid solution was diluted to 1 mol/L and then added into the starch slurry for acid hydrolysis, and the acid hydrolysis was carried out for 2.5 h; after that, the 10 mol/L sodium hydroxide solution was added to adjust pH to 4; the temperature of the acid-hydrolyzed starch slurry was adjusted to 80° C., and the acid-hydrolyzed starch slurry was pre-gelatinized for 40 min and then cooled to 70° C. for reacting;
(3) 4 g of the initiator was dissolved in 5 g of dilute nitric acid to prepare an initiator solution, 1.96 g of the emulsifier was dissolved in 24.8 g of water to prepare a 5% emulsifier solution, all 15 g of the crosslinking monomer was added to the emulsifier, and pre-emulsification was performed by using a high-speed shearing machine to prepare a pre-emulsion;
(4) all the initiator solution obtained in step (3) was added to the pre-gelatinized starch slurry obtained in step (2), and the pre-emulsion was dripped into the reaction system obtained after pre-gelatinization in step (2) at a constant speed within 90 min; after the dropwise addition was completed, 4 g of the initiator was added again and dissolved in 5 g of the dilute nitric acid to prepare an initiator solution, and the reaction was carried out for 90 min to obtain a modified mixed emulsion system;

(5) the crosslinked and modified mixed emulsion system obtained in step (4) was cooled to 50° C., and the pH of the emulsion was adjusted to 6, so that the starch-based adhesive was obtained; and (6) when in use, the obtained starch-based adhesive and the binary crosslinking agent were pre-mixed uniformly and then applied to hot-pressing of the particleboards.

The product obtained in this example has a milky white and glossy appearance, and is lower in initial viscosity, which meets the use requirements of the particleboards. Referring to the method of "Determination of adhesive curing time" mentioned earlier, the adhesive curing time was determined to be 90 s.

The thickness swelling rates of water absorption of the particleboards obtained by hot-pressing for 5 min at 170° C. and 11 MPa are 10%, which exceeds 8% and thus does not meet the requirement for P2 type particleboards in the national standard.

Example 8

| Formula (mass/g): | |
|---|---|
| corn starch | 150 |
| water | 350 |
| a 12 mol/L concentrated hydrochloric acid solution | 24 |
| a 10 mol/L sodium hydroxide solution | 33 |
| a 0.5 mol/L dilute nitric acid solution | 10 |
| ceric ammonium nitrate (an initiator) | 8 |
| disodium sulfosuccinate decyl polyoxyethylene (6) ether ester (an emulsifier) | 1.96 |
| diacetone acrylamide (a crosslinking monomer) | 15 |
| adipic dihydrazide (a binary crosslinking agent) | 15 |

Technological Process:
(1) the starch and the water were blended into starch slurry with a mass ratio of 45% on a dry basis of starch, and stirred evenly for later use;
(2) the starch slurry obtained in step (1) was heated up to 60° C., 24 g of the 12 mol/L concentrated hydrochloric acid solution was diluted to 1.5 mol/L and then added into the starch slurry for acid hydrolysis, and the acid hydrolysis was carried out for 2.5 h; after that, the 10 mol/L sodium hydroxide solution was added to adjust pH to 4; the temperature of the acid-hydrolyzed starch slurry was adjusted to 80° C., and the reaction temperature was kept unchanged at 80° C. after pre-gelatinization for 40 min;
(3) 4 g of the initiator was dissolved in 5 g of dilute nitric acid to prepare an initiator solution, 1.96 g of the emulsifier was dissolved in 24.8 g of water to prepare a 5% emulsifier solution, all 15 g of the crosslinking monomer was added to the emulsifier, and pre-emulsification was performed by using a high-speed shearing machine to prepare a pre-emulsion;
(4) all the initiator solution obtained in step (3) was added to the pre-gelatinized starch slurry obtained in step (2), and the pre-emulsion was dripped into the reaction system obtained after pre-gelatinization in step (2) at a constant speed within 90 min; after the dropwise addition was completed, 4 g of the initiator was added again and dissolved in 5 g of the dilute nitric acid to prepare an initiator solution, and there action was carried out for 90 min to obtain a modified mixed emulsion system;
(5) the modified mixed emulsion system obtained in step (4) was cooled to 50° C., and the pH of the emulsion was adjusted to 6, so that the starch-based adhesive was obtained; and
(6) when in use, the obtained starch-based adhesive and the binary crosslinking agent were pre-mixed uniformly and then applied to hot-pressing of the particleboards.

The product obtained in this example has a slurry y white and glossy appearance, and is lower in initial viscosity, which meets the use requirements of the particleboards. Referring to the method of "Determination of adhesive curing time" mentioned earlier, the adhesive curing time was determined to be 100 s; and after the adhesive was placed for a period of time, delamination occurred, which proved that the adhesive has no practical value.

Examples 1, 7, and 8 are used to demonstrate the effect of the reaction conditions on the adhesive curing time. From the above data, the significance analysis shows that if the reaction temperature is too low, the grafting efficiency of the monomer will be affected, resulting in prolonged curing time, while too high acid hydrolysis concentration will lead to excessive disintegration, so as to reduce the reaction efficiency and further cause a phenomenon of delamination. Therefore, the optimal reaction conditions are a hydrochloric acid concentration of 1 mol/L and a reaction temperature of 80° C.

Example 9

| Formula (mass/g): | |
|---|---|
| corn starch | 150 |
| water | 350 |
| a 12 mol/L concentrated hydrochloric acid solution | 18 |
| a 10 mol/L sodium hydroxide solution | 33 |
| a 0.5 mol/L dilute nitric acid solution | 10 |
| ceric ammonium nitrate (an initiator) | 8 |
| disodium sulfosuccinate decyl polyoxyethylene (6) ether ester (an emulsifier) | 1.96 |
| hydroxybutyl methacrylate (a crosslinking monomer) | 15 |
| succinic dihydrazide (a binary crosslinking agent) | 15 |

Technological Process:
(1) the starch and the water were blended into starch slurry with a mass ratio of 45% on a dry basis of starch, and stirred evenly for later use;
(2) the starch slurry obtained in step (1) was heated up to 60° C., 18 g of the 12 mol/L concentrated hydrochloric acid solution was diluted to 1 mol/L and then added into the starch slurry for acid hydrolysis, and the acid hydrolysis was carried out for 2.5 h; after that, the 10 mol/L sodium hydroxide solution was added to adjust pH to 4; the temperature of the acid-hydrolyzed starch slurry was adjusted to 80° C., and the reaction temperature was kept unchanged at 80° C. after pre-gelatinization for 40 min;
(3) 4 g of the initiator was dissolved in 5 g of dilute nitric acid to prepare an initiator solution, 1.96 g of the emulsifier was dissolved in 24.8 g of water to prepare a 5% emulsifier solution, all 15 g of the crosslinking monomer was added to the emulsifier, and pre-emulsification was performed by using a high-speed shearing machine to prepare a pre-emulsion;

(4) all the initiator solution obtained in step (3) was added to the pre-gelatinized starch slurry obtained in step (2), and the pre-emulsion was dripped into the reaction system obtained after pre-gelatinization in step (2) at a constant speed within 90 min; after the dropwise addition was completed, 4 g of the initiator was added again and dissolved in 5 g of the dilute nitric acid to prepare an initiator solution, and the reaction was carried out for 90 min to obtain a modified mixed emulsion system;

(5) the modified mixed emulsion system obtained in step (4) was cooled to 50° C., and the pH of the emulsion was adjusted to 6, so that the starch-based adhesive was obtained; and (6) when in use, the obtained starch-based adhesive and the binary crosslinking agent were pre-mixed uniformly and then applied to hot-pressing of the particleboards.

The product obtained in this example has a milky white and glossy appearance, and is lower in initial viscosity, which meets the use requirements of the particleboards. Referring to the method of "Determination of adhesive curing time" mentioned earlier, the adhesive curing time was determined to be 65 s.

The thickness swelling rates of water absorption of the particleboards obtained by hot-pressing for 5 min at 170° C. and 11 MPa are 7%, which meets the requirement for P2 type particleboards in the national standard.

Example 10

| Formula (mass/g): | |
|---|---|
| corn starch | 150 |
| water | 350 |
| a 12 mol/L concentrated hydrochloric acid solution | 18 |
| a 10 mol/L sodium hydroxide solution | 33 |
| ammonium persulfate (an initiator) | 1.21 |
| disodium sulfosuccinate decyl polyoxyethylene (6) ether ester (an emulsifier) | 1.96 |
| diacetone acrylamide (a crosslinking monomer) | 15 |
| adipic dihydrazide (a binary crosslinking agent) | 15 |

Technological Process:
(1) the starch and the water were blended into starch slurry with a mass ratio of 45% on a dry basis of starch, and stirred evenly for later use;
(2) the starch slurry obtained in step (1) was heated up to 60° C., 18 g of the 12 mol/L concentrated hydrochloric acid solution was diluted to 1 mol/L and then added into the starch slurry for acid hydrolysis, and the acid hydrolysis was carried out for 2 h; after that, the 10 mol/L sodium hydroxide solution was added to adjust pH to 4; the temperature of the acid-hydrolyzed starch slurry was adjusted to 80° C., and the reaction temperature was kept unchanged at 80° C. after pre-gelatinization for 30 min;
(3) 0.91 g of the initiator was dissolved in 35 g of water to prepare an initiator solution, and 1.96 g of the emulsifier was dissolved in 24.8 g of water to prepare a 5% emulsifier solution;

(4) all the solution obtained in step (3) was added to the pre-gelatinized starch slurry obtained in step (2), and the crosslinking monomer was dripped into the reaction system obtained after pre-gelatinization in step (2) at a constant speed within 105 min; after the dropwise addition was completed, 10 g of the initiator solution with a mass concentration of 3% was added, and the reaction was carried out for 105 min to obtain a modified mixed emulsion system;

(5) the modified mixed emulsion system obtained in step (4) was cooled to 50° C., and the pH of the emulsion was adjusted to 5, so that the starch-based adhesive was obtained; and (6) when in use, the obtained starch-based adhesive and the binary crosslinking agent were pre-mixed uniformly and then applied to hot-pressing of the particleboards.

The product obtained in this example has a milky white and glossy appearance, and is lower in initial viscosity, which meets the use requirements of the particleboards. Referring to the method of "Determination of adhesive curing time" mentioned earlier, the adhesive curing time was determined to be 120 s.

The thickness swelling rates of water absorption of the particleboards obtained by hot-pressing for 5 min at 170° C. and 11 MPa are 10%, which does not meet the requirement for P2 type particleboards in the national standard.

Example 11

| Formula (mass/g): | |
|---|---|
| corn starch | 150 |
| water | 350 |
| a 12 mol/L concentrated hydrochloric acid solution | 18 |
| a 10 mol/L sodium hydroxide solution | 33 |
| ammonium persulfate (an initiator) | 1.21 |
| sodium dodecyl sulfonate (an emulsifier) | 1.96 |
| diacetone acrylamide (a crosslinking monomer) | 15 |
| adipic dihydrazide (a binary crosslinking agent) | 15 |

Technological Process:
(1) the starch and the water were blended into starch slurry with a mass ratio of 45% on a dry basis of starch, and stirred evenly for later use;
(2) the starch slurry obtained in step (1) was heated up to 60° C., 18 g of the 12 mol/L concentrated hydrochloric acid solution was diluted to 1 mol/L and then added into the starch slurry for acid hydrolysis, and the acid hydrolysis was carried out for 2 h; after that, the 10 mol/L sodium hydroxide solution was added to adjust pH to 4; the temperature of the acid-hydrolyzed starch slurry was adjusted to 80° C., and the reaction temperature was kept unchanged at 80° C. after pre-gelatinization for 30 min;
(3) 0.91 g of the initiator was dissolved in 35 g of water to prepare an initiator solution, and 1.96 g of the emulsifier was dissolved in 24.8 g of water to prepare a 5% emulsifier solution;
(4) all the solution obtained in step (3) was added to the pre-gelatinized starch slurry obtained in step (2), and the crosslinking monomer was dripped into the reaction system obtained after pre-gelatinization in step (2) at a constant speed within 105 min; after the dropwise addition was completed, 10 g of the initiator solution with a mass concentration of 3% was added, and there action was carried out for 105 min to obtain a modified mixed emulsion system;

(5) the modified mixed emulsion system obtained in step (4) was cooled to 50° C., and the pH of the emulsion was adjusted to 5, so that the starch-based adhesive was obtained; and (6) when in use, the obtained starch-based adhesive and the binary crosslinking agent were pre-mixed uniformly and then applied to hot-pressing of the particleboards.

The product obtained in this example has a milky white and glossy appearance, and is lower in initial viscosity, which meets the use requirements of the particleboards. Referring to the method of "Determination of adhesive curing time" mentioned earlier, the adhesive curing time was determined to be 130 s.

The thickness swelling rates of water absorption of the particleboards obtained by hot-pressing for 5 min at 170° C. and 11 MPa are 12%, which does not meet the requirement for P2 type particleboards in the national standard.

Example 12

| Formula (mass/g): | |
| --- | --- |
| corn starch | 150 |
| water | 350 |
| a 12 mol/L concentrated hydrochloric acid solution | 18 |
| a 10 mol/L sodium hydroxide solution | 33 |
| a 0.5 mol/L dilute nitric acid solution | 10 |
| ceric ammonium nitrate (an initiator) | 8 |
| sodium dodecyl sulfonate (an emulsifier) | 1.96 |
| diacetone acrylamide (a crosslinking monomer) | 15 |
| adipic dihydrazide (a binary crosslinking agent) | 15 |

Technological Process:

(1) the starch and the water were blended into starch slurry with a mass ratio of 45% on a dry basis of starch, and stirred evenly for later use;

(2) the starch slurry obtained in step (1) was heated up to 60° C., 18 g of the 12 mol/L concentrated hydrochloric acid solution was diluted to 1 mol/L and then added into the starch slurry for acid hydrolysis, and the acid hydrolysis was carried out for 2.5 h; after that, the 10 mol/L sodium hydroxide solution was added to adjust pH to 4; the temperature of the acid-hydrolyzed starch slurry was adjusted to 80° C., and the reaction temperature was kept unchanged at 80° C. after pre-gelatinization for 40 min;

(3) 4 g of the initiator was dissolved in 5 g of dilute nitric acid to prepare an initiator solution, 1.96 g of the emulsifier was dissolved in 24.8 g of water to prepare a 5% emulsifier solution, all 15 g of the crosslinking monomer was added to the emulsifier, and pre-emulsification was performed by using a high-speed shearing machine to prepare a pre-emulsion;

(4) all the initiator solution obtained in step (3) was added to the pre-gelatinized starch slurry obtained in step (2), and the pre-emulsion was dripped into the reaction system obtained after pre-gelatinization in step (2) at a constant speed within 90 min; after the dropwise addition was completed, 4 g of the initiator was added again and dissolved in 5 g of the dilute nitric acid to prepare an initiator solution, and the reaction was carried out for 90 min to obtain a modified mixed emulsion system;

(5) the modified mixed emulsion system obtained in step (4) was cooled to 50° C., and the pH of the emulsion was adjusted to 6, so that the starch-based adhesive was obtained; and (6) when in use, the obtained starch-based adhesive and the binary crosslinking agent were pre-mixed uniformly and then applied to hot-pressing of the particleboards.

The product obtained in this example has a slurry y white and glossy appearance, and is lower in initial viscosity, which meets the use requirements of the particleboards.

Referring to the method of "Determination of adhesive curing time" mentioned earlier, the adhesive curing time was determined to be 110 s.

The thickness swelling rates of water absorption of the particleboards obtained by hot-pressing for 5 min at 170° C. and 11 MPa are 9%, which does not meet the requirement for P2 type particleboards in the national standard.

Although the present disclosure has been disclosed as above with preferred examples, it is not intended to limit the present disclosure. Anyone familiar with this technology can make various changes and modifications without departing from the spirit and scope of the present disclosure. Therefore, the scope of protection of the present disclosure shall be subject to those defined content in the Claims.

What is claimed is:

1. A high-temperature fast-curing starch-based adhesive for particleboards, wherein the formula of the starch-based adhesive for the particleboards comprises: (in parts by mass)
   starch 150 parts
   water 250-500 parts
   concentrated hydrochloric acid 8-20 parts
   dilute nitric acid 8-13 parts
   a sodium hydroxide solution 25-40 parts
   an initiator 6-10 parts
   a crosslinking monomer 12-18 parts
   an emulsifier 2-5 parts
   a binary crosslinking agent 12-18 parts; and
   the initiator in the formula is cerium nitrate salt.

2. The starch-based adhesive for the particleboards according to claim 1, wherein the starch in the formula is any one or a combination of corn starch, waxy corn starch, tapioca starch, wheat starch, and potato starch.

3. The starch-based adhesive for the particleboards according to claim 1, wherein the emulsifier in the formula is disodium sulfosuccinate decyl polyoxyethylene (6) ether ester.

4. The starch-based adhesive for the particleboards according to claim 1, wherein the crosslinking monomer in the formula is one or a mixture of diacetone acrylamide and hydroxybutyl methacrylate.

5. The starch-based adhesive for the particleboards according to claim 1, wherein the binary crosslinking agent in the formula is one or a mixture of adipic dihydrazide and succinic dihydrazide.

6. The starch-based adhesive for the particleboards according to claim 1, wherein a preparation method of the starch-based adhesive for the particleboards comprises:

(1) blending the starch and the water into starch slurry with a mass ratio of 30-50% on a dry basis of starch, and stirring evenly for later use;

(2) heating the starch slurry obtained in step (1) up to 60° C., adding hydrochloric acid diluted to 0.8-1.2 mol/L for acid hydrolysis, and then adding the sodium hydroxide solution to adjust the pH of the starch slurry to pH 3-5; after the acid hydrolysis, adjusting the temperature of the starch slurry to 70-90° C., and pre-gelatinizing to obtain pre-gelatinized starch slurry;

(3) taking the initiator that accounts for 30% to 60% of the total mass of the initiator and adding the dilute nitric acid to prepare an initiator solution; taking a certain mass of the emulsifier and adding water to prepare an emulsifier solution with a mass concentration of 2% to 6%; mixing the prepared emulsifier solution with 10-20 g of the crosslinking monomer, and then performing pre-emulsification by using a high-speed shearing machine to prepare a pre-emulsion;

(4) adding all the initiator solution obtained in step (3) to the pre-gelatinized starch slurry obtained in step (2), and dropwise adding the pre-emulsion obtained in step (3) to the pre-gelatinized starch slurry obtained in step (2) at a constant speed; after the dropwise addition is completed, adding a reformulated initiator solution, where the reformulated initiator solution is prepared by adding the dilute nitric acid to the remaining initiator which accounts for 40% to 70% of the total mass of the initiator to formulate the initiator solution, and carrying out heat preservation again, so as to obtain a modified mixed emulsion system; and (5) cooling the modified mixed emulsion system obtained in step (4) to 30-50° C., adjusting the pH of the emulsion to pH 6-8, and evenly mixing with the binary crosslinking agent to obtain the starch-based adhesive.

7. The starch-based adhesive for the particleboards according to claim 6, wherein the acid hydrolysis time of step (2) is 2-4 hours.

8. The starch-based adhesive for the particleboards according to claim 6, wherein the pre-gelatinization time of step (2) is 30-60 minutes.

9. The starch-based adhesive for the particleboards according to claim 6, wherein the dropwise addition time of step (4) is controlled within 90-120 minutes.

10. Application of the high-temperature fast-curing starch-based adhesive for the particleboards according to claim 1 in hot-press bonding of the particleboards, plywood, fiberboard and wood blocks; and the application process is as follows: the high-temperature fast-curing starch-based adhesive and wood shavings are evenly mixed and paved, and is shaped by pressing under the conditions that the hot-pressing pressure is 3-11 MPa and the hot-pressing temperature is 130-180° C.

\* \* \* \* \*